Dec. 31, 1963  S. A. PFISTER ETAL  3,116,068
TORQUE TRANSMITTING CONNECTING MECHANISM
Filed Sept. 13, 1962  3 Sheets-Sheet 1

INVENTORS
STANLEY A. PFISTER
TED A. TURNER
HERBERT R. UHTENWOLDT
BY
ATTORNEYS 3,116,068
TORQUE TRANSMITTING CONNECTING
MECHANISM
Stanley A. Pfister, Ted A. Turner, and Herbert R. Uhtenwoldt, Wilmington, Ohio, assignors to The Cincinnati Milling Machine Co., Cincinnati, Ohio, a corporation of Ohio
Filed Sept. 13, 1962, Ser. No. 223,330
5 Claims. (Cl. 279—72)

The present invention relates to a quickly detachable torque transmitting connecting mechanism as, for example, utilized to connect a tool to a driving spindle in a machine tool, which mechanism is particularly adapted for tool insertion and removal while the spindle is rotating.

It is often desirable in machine tool operations, where frequent tool changes are required, to be able to change the tool on a spindle while the spindle is running and thus avoid the delay inherent in allowing the spindle to come to rest for each tool change. Connecting mechanisms with which release and engagement of the tool are effected by simple, short, movements of elements lend themselves to actuation while the spindle is running, but render it more difficult to achieve a firm grip on the tool. Mechanism requiring threaded engagement and disengagement to connect and disconnect the tool to the spindle, although capable of exerting a firm grip on the tool, are generally unsuitable for tool changes while the spindle is running.

Some connecting mechanisms proposed for tool changes in a running spindle rely on a tang on the tool, or tool holder, inserted into a slot on the spindle, or spindle chuck, to transmit the torque from the spindle to the tool. Usually a latch is provided to hold the tool in the spindle. In this type of mechanism, the impact to which the tang is subjected each time the tool is inserted in the spindle promotes wear and shortens the life of the tool, and often the tool can not be firmly seated in the spindle. Other connecting mechanisms have a set of balls to transmit the torque between the spindle and the tool. Each ball makes only point contact with the tool and, when the torque is large, the tool becomes pitted. Frequently, another set of balls or other latching mechanism is provided to hold the tool in the spindle but, like the mechanism used in conjunction with the tanged tool, often fails to hold the tool securely in the spindle.

In the present invention there is provided a connecting mechanism which is not only actuated by a short, simple movement for quick release and insertion of a tool while the spindle is running, but also permits a firm grip on the tool. This is accomplished by the use of intermediate members, preferably tapered rollers, which make line contact with a tapered cam surface not only to transmit the torque but also to provide a firm connecting grip.

It is one object of the present invention to provide an improved, quickly detachable, torque transmitting connecting mechanism. It is another object of the present invention to provide improved mechanism, capable of exerting a firm grip on the tool, for use in a machine tool to permit quick insertion and removal of tools. It is another object of the present invention to provide an improved machine tool mechanism to permit a tool to be firmly connected to, and detached from, a spindle while the spindle is running. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
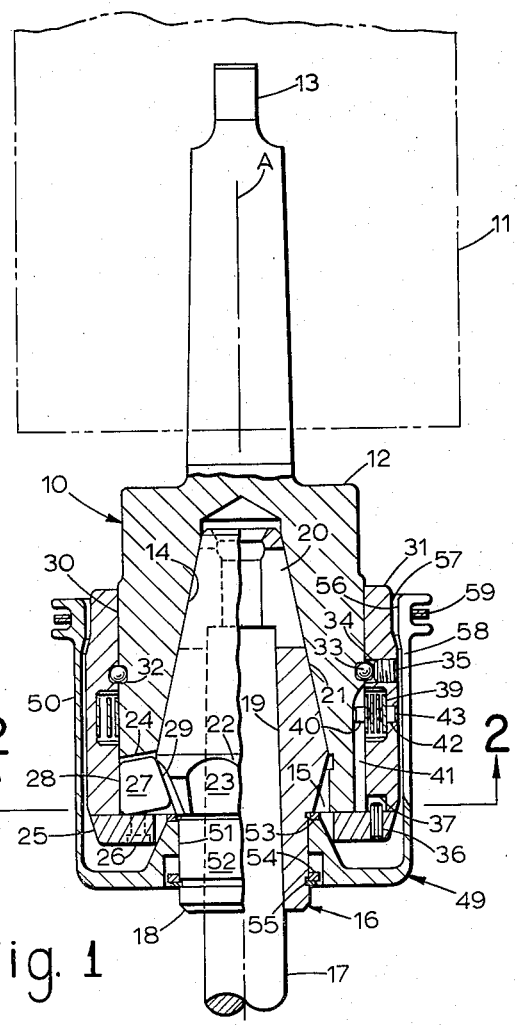
FIG. 1 is a view, partly in cross-section, of the connecting mechanism of the present invention with the tool member fully seated in the spindle member.

There is shown in the drawings a chuck, indicated generally at 10, which may be part of a machine tool spindle 11, or may be adapted for connection thereto, as shown, for rotation about a central axis A. In either case, the chuck rotates with the spindle and may be considered a driving member, or a spindle member. In the embodiment of the invention shown, the inner end of the chuck body 12 has a tang 13 secured in the end of the spindle in a conventional manner, and the chuck body 12 has a central blind bore 14, of circular cross-section, with a terminal opening 15 at the outer end to receive a tool member, indicated generally at 16, on axis A. The tool member 16 comprises a cutting tool 17 and body 18 which may be integral or, as shown, may constitute separate members with the body 18 defining a tool holder adapted to securely grip the tool; in either case, the tool member, when locked in the chuck, is driven thereby and may be considered a driven member. In the embodiment of the invention shown, the tool holder 18 has a tapered central bore 19 to tightly grip and hold the tapered shank of tool 17, and a longitudinal slot 20 in the tool holder is provided to receive a release, or drift, key for removal of the tool from the tool holder when, for example, the tool 17 is worn or broken.

Figure 3:
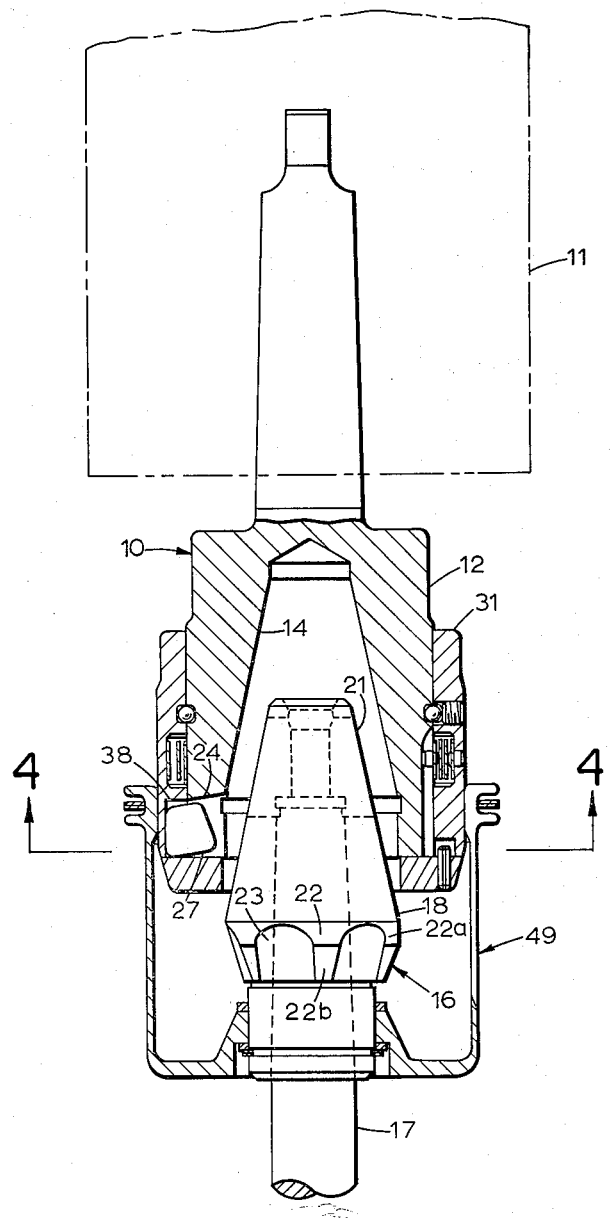
FIG. 3 is a view similar to FIG. 1 except that the tool member is not fully seated in the spindle member.

The bore 14 in chuck body 12 tapers outwardly toward the terminal opening 15 at the outer end of the chuck body and defines a seat for the tool member body 18 which has a tapered seat portion 21 of circular cross-section complementary to the taper in bore 14, that is, tapering outwardly from the end received in the spindle member. The tool member 18 has a shoulder portion 22 adjacent tapered portion 21, and toward the cutting end of the tool member therefrom, which comprises a cylindrical section 22a and a section 22b defining a truncated cone (see FIG. 3). Section 22b is tapered oppositely to portion 21, that is, tapers outwardly toward the end of the tool member received in the spindle member (or tapers inwardly toward the cutting end of the tool member). The shoulder portion 22 has six equally angularly spaced flats 23 thereon which are tapered in the same direction as section 22b. In other words, the flats 23, which are inside the chuck body 12 when the tool member is seated in the chuck body, taper inwardly toward the axis A as said flats extend toward the bore opening when the tool member is seated in the chuck body, as shown in FIG. 1.

The chuck body 12 has three axially extending slots 24 cut into the periphery at the outer end of the chuck body. The peripheral slots 24 are equally angularly spaced about the central axis A (120 degrees apart) and communicate with bore 14. The slots extend in the axial direction and are closed at the outer end by an annular plate 25 secured to the chuck body 12 by screws 26. The slots 24, which are in registration with shoulder portion 22 of the tool member body 18 when the tool member is seated in the chuck, each receive a roller 27, which define intermediate connecting members between the spindle member and the tool member. As shown best in FIG. 5, each roller 27 is tapered at an angle α approximately one-half the angle 2 α of the taper of the flats 23 and the rollers are positioned in complementary relation to the flats, that is, with the larger end of the roller toward the outer end of chuck body 12, so that when the rollers 27 are engaged with the flats 23 on shoulder portion 22, the outer elements of the rollers, as at 28, are parallel to the axis A. Thus the longitudinal axis B of each roller, while extending generally in the axial direction, is tilted slightly thereto. The slots 24 are tapered as the rollers (broader toward the outer end of chuck body 12) and, although in communication with bore 14 to permit the rollers to extend into bore 14, the slots embrace the radially inner sides of the rollers to prevent the rollers from dropping into the bore 14.

Figure 2:
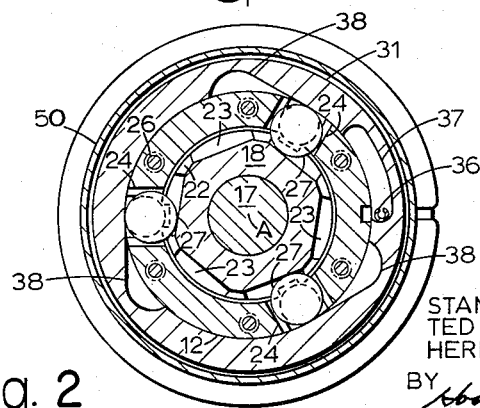
FIG. 2 is a view taken on the line 2—2 of FIG. 1.

Since the distance of the surface of a flat 23 from the central axis A varies across the flat, as shown best in FIG. 2, a flat 23 defines a cam surface to lock the tool member 16 against rotation relative to the chuck body 12 when a roller 27, which is confined in a slot 24 of the chuck body, is held against the flat. Thus, the rollers serve to transmit torque between the chuck body 12 and the tool member 16. Since the flats 23 on shoulder portion 22, which are inside the chuck body 12 when the tool member is seated in the chuck body, taper inwardly toward the axis A as said flats extend toward the bore opening when the tool member is seated in the chuck body, the rollers, when held against the flats 23, also serve to hold the tool member 16 in the chuck.

At least a portion of the surface of the chuck body 12, as at 30, is cylindrical about axis A (thus parallel to axis A) and the chuck has an annular member, or locking sleeve 31 (also cylindrical about, and parallel to, axis A), received thereon, against the annular outer end plate 25 and over the radial slots 24. The sleeve 31 and chuck body 12 together define an annular groove 32 into which a plurality of balls 33 are received through a sleeve opening 34 having a threaded plug 35. The balls 33, when retained in groove 32 by plug 35, serve to hold the sleeve 31, which is rotatable relative to chuck body 12, against axial movement relative thereto. The chuck body end plate 25 has a pin 36 secured therein which is received in an arcuate, circumferentially extending, groove 37 in sleeve 31 to limit the relative rotation between the sleeve 31 and the chuck body 12.

Figure 4:
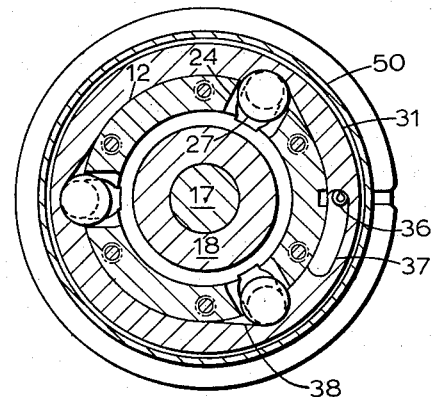
FIG. 4 is a view taken on the line 4—4 of FIG. 3.

The sleeve 31 has three equally angularly spaced pockets 38 (120 degrees apart) in the inner surface which, when the sleeve 31 is in one extreme angular position (which may be referred to as a release position) relative to chuck body 12, are in registration and communication with the slots 24 (see FIG. 4), and when the sleeve 31 is in the other extreme angular position (which may be referred to as a lock position) relative to chuck body 12, are out of registration and communication with the slots 24 (see FIG. 2). One end of a coil spring 39 has a pin 40 received in a longitudinal slot 41 in the chuck body 12, and the other end of the spring 39 has a pin 42 received in a hole 43 in the sleeve 31. The spring 39 biases the sleeve 31 counterclockwise (as viewed, for example, in FIG. 2) relative to the chuck body 12 to normally hold the sleeve 31 in the lock position relative to the chuck body with the pockets 38 out of registration with the slots 24. One side of each pocket 38 is tangential to the inner surface of the annular sleeve, and the spring easily snaps the sleeve to the lock position when the tool member is free to rotate and bring the center portion of the flats 23 under the rollers 27.

A cup member 49 has a cylindrical shell portion 50 integral with a hub portion 51 which is received on a cylindrical portion 52 of the tool member body 18 adjacent the shoulder portion 22 thereof and toward the cutting end of the tool member therefrom. The hub 51, which is straddled by washers 53, 54, is rotatable relative to the tool member body and has a limited axial movement relative thereto between the shoulder 22 and a snap ring 55 on the tool member body. The cylindrical shell 50, which is cylindrical about axis A, extends over the sleeve 31 when the tool member is in the chuck body, and the shell and sleeve both have portions, 56, 57, respectively, of reduced diameter, at the ends remote from the cutting end of the tool member, which are in registration when the tool member is fully seated in the chuck.

In a job requiring several different tools, each tool will be mounted in a tool holder having a cup member thereon. Each tool can be quickly inserted or removed during the job even when the spindle is running. Assume, at the beginning of the job, the spindle is rotating and no tool member is in the chuck. The chuck body will be rotating in the counterclockwise direction (as viewed in FIG. 2 or 4) with the sleeve 31 rotating therewith and biased into the lock position (shown in FIG. 2) relative to the chuck body 12 by spring 39. The shell portion 50 of the cup 49 carried by the tool member is manually grasped by the operator and the tool member inserted in the bore opening 15. The shell 50 has an elongated, axially extending narrow slot 58 and a resilient ring 59 encircles the shell at the reduced diameter portion 56 to hold that portion at a diameter slightly smaller than the outer diameter of sleeve 31. The reduced diameter portion 56 of shell 50 effects frictional engagement with sleeve 31 as the tool member 16 is inserted in the chuck. Since the shell 50 is held without rotation by the operator, and the chuck body 12 is rotating in the counterclockwise direction, the sleeve 31 is momentarily stopped until it is in the release position (see FIG. 4) with the pockets 38 in registration with slots 24. The rollers 37, under centrifugal force or by engagement with the advancing tool member, move radially outward out of the bore opening 15 and into the pockets 38 to permit entry of the tool member. Since the sleeve 31 is capable of only a limited rotation relative to the chuck body 12 by virtue of pin 36 and groove 37, the sleeve 31 rotates in frictional engagement with shell 50 until the reduced portion 56 of the shell moves into registration with the reduced portion 57 of the sleeve as the tool member 16 moves into seating engagement with the chuck body. At this time there is clearance between the shell 50 and the sleeve 31, and the sleeve 31 is snapped back to the lock position on the chuck body by spring 39, as shown in FIG. 2. This completes insertion of the tool in the chuck and the tool is ready to begin cutting.

Figure 5:
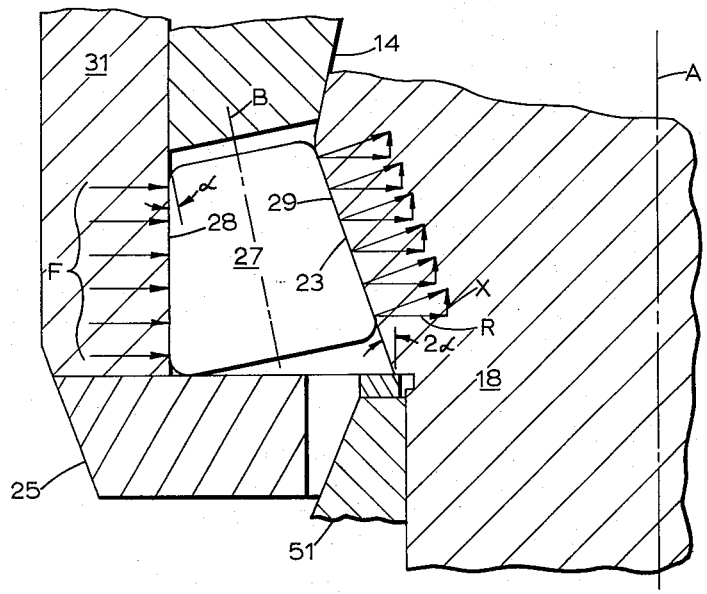
FIG. 5 is a schematic diagram of the forces holding the tool member in the spindle member.

As the tool, which is rotated counterclockwise by the chuck, encounters resistance it is urged clockwise relative to the chuck body to cam the rollers against the inner surface of the sleeve 31, as shown best in FIG. 2. Thus, as best shown in FIG. 5, a reactive force F is exerted by the sleeve 31 on each of the rollers 27, which force is transmitted by the rollers to the tool member body 18. Because each roller 27 reacts on a surface 23 of the tool member body which is tapered, the reactive force produces a radial force component R and an axial force component X. Since surface 23 of the tool member body is tapered outwardly toward the end of the tool member received in the chuck, the axial force component X holds the tool member firmly against the seat in the chuck defined by tapered bore 14, and the greater the torque transmitted, the greater these forces and the more firmly the tool member is held in the chuck.

The outer elements 28 of the rollers 27, since these elements are parallel to axis A, make line contact with the sleeve 31 (also parallel to axis A) and the inner elements 29 of the rollers, because the rollers have a taper equal to one-half the taper on the flats 23 on the tool member, make line contact with these tapered flats. The reactive force exerted by sleeve 31 on each roller 27, and the reactive force exerted by each roller 27 on the tool member body 18, do not act at a point but, instead, act along a line as indicated in FIG. 5. This distribution of the reactive force acting on the tool member permits a firmer grip of the tool member and minimizes pitting of the tool member.

To remove the tool member from the rotating spindle member, the operator grasps the shell 50 manually and pulls down as viewed in FIG. 1. Because of the limited axial movement of the hub 51 on the tool portion 52, the shell 50 can be pulled into frictional engagement with the sleeve while the tool member is still locked in the chuck. As before, this frictional engagement shifts the locking sleeve 31 to the release position and the tool member can then be removed from the chuck. Other tools, similar to tool member 16 and each carrying a cup member, can be successively inserted in the chuck 10 for successive operations on the workpiece.

We claim:

1. A quickly detachable torque transmitting connecting mechanism comprising in combination:
    (a) a first member having a bore on an axis with a terminal opening and having a peripheral slot in communication with said bore,
    (b) a second member having a tapered cam surface thereon, said second member adapted to seat in said bore on said axis with said tapered cam surface aligned in the axial direction with said slot, said cam surface tapering inwardly toward the axis as said cam surface extends toward said bore opening when said second member is seated in said first member,
    (c) an intermediate member loosely received in said slot and extending into said bore when held inwardly in said slot, said intermediate member shaped for line engagement with the tapered cam surface when the second member is seated in said bore, said intermediate member effective when held in line engagement with said tapered cam surface to hold said second member in said first member by virtue of the taper of the surface and effective to lock said second member against rotation relative to said first member by virtue of the cam conformation of said surface, and
    (d) a locking member received on said first member and shiftable thereon between a position to engage the intermediate member and hold the intermediate member inwardly in said slot and a position to permit movement of the intermediate member outwardly in the slot and out of the bore for insertion and removal of said second member.

2. A quickly detachable torque transmitting connecting mechanism comprising in combination:
    (a) a first member having a bore on an axis and having a plurality of axially extending peripheral slots in communication with said bore,
    (b) a roller loosely received in each of said slots and movable radially inwardly therein to extend into said bore,
    (c) a second member adapted to be received in said bore and seat therein, said second member having a plurality of axially extending surfaces for line engagement with said rollers when said second member is seated in said bore and said rollers are held radially inwardly in said slots, said surfaces tapered relative to the axis to hold said second member in said first member when said rollers are in line engagement with the surfaces, and each of said surfaces defining a cam surface to lock said second member against rotation relative to said first member when said rollers are in line engagement with said surfaces, and
    (d) a locking member received on said first member over said peripheral slots and having a plurality of pockets on the inner surface thereof, said locking member positionable on said first member with said pockets out of registration with said slots to hold the rollers radially inwardly in line engagement with said surfaces, said locking member shiftable on said first member to move said pockets into registration with said slots to permit radial outward movement of the rollers for insertion and removal of said second member.

3. A quickly detachable torque transmitting connecting mechanism comprising in combination:
    (a) a driving member rotatable about an axis having a bore on said axis with a terminal opening, said driving member having a plurality of angularly spaced axially extending peripheral slots in communication with said bore,
    (b) a tapered roller received in each of said slots with the larger end toward the terminal opening of the bore, said rollers movable radially inwardly in the slots to extend into said bore,
    (c) a driven member adapted to be received in said bore and seat therein on said axis, said driven member having a shoulder portion axially aligned with said slots when said driven member is seated in said bore, said shoulder portion having a plurality of angularly spaced axially extending cam surfaces tapering in complementary relationship to said rollers for line engagement with said rollers when said rollers are held radially inwardly in said slots and said driven member is seated in the bore, each cam surface varying in distance from the axis across the cam surface to lock the driven member against rotation relative to the driving member when the cam surfaces are in line engagement with the rollers, and
    (d) a locking member rotatably received on said driving member over said slots and having a plurality of pockets on the inner surface theerof, said locking member positionable on said driving member with said pockets out of registration with said slots to hold the rollers radially inwardly in line engagement with said cam surfaces, said locking member rotatable on said driving member to move said pockets into registration with said slots and permit radial outward movement of the rollers for insertion and removal of said driven member.

4. A quickly detachable torque transmitting tool connecting mechanism comprising in combination:
    (a) a spindle member adapted for rotation about a central axis having a bore on said axis wtih a terminal opening and having at least three equally angularly spaced axially extending peripheral slots in communication with said bore, at least a portion of the external surface of said spindle member cylindrical about said axis,
    (b) a tool member adapted to be received in said bore to seat therein and having a shoulder with at least three equally angularly spaced axially extending tapered surfaces thereon, said surfaces axially aligned with said slots and tapering toward the axis as said surfaces extend toward said bore opening when the tool member is seated in the bore, each of said surfaces varying in distance from the axis across the surface to define a cam surface,
    (c) a tapered roller received in each of said slots and movable radially inwardly therein to extend into the bore for line engagement with one of said cam surfaces, said rollers positioned in complementary relationship to the cam surfaces and having a taper approximately one-half the taper of each cam surface to render the outer elements of each roller parallel to the cylindrical surface of the spindle member when the rollers are in line engagement with the tapered cam surfaces on the shoulder portion of the tool member, said rollers effective when held in line engagement with said cam surfaces to apply an axial force to said tool member holding the tool member in the spindle member by virtue of the taper of the surfaces and effective to apply a force to said tool member locking the tool member against rotation relative to said spindle member by virtue of the cam conformation of the surfaces, said forces increasing as the torque between the spindle member and the tool member increases.

(d) an axially fixed locking sleeve received on the cylindrical surface portion of said spindle member and over said slots for rotation about said axis, said sleeve having a pocket on the inner surface thereof for each slot, said sleeve normally biased to an angular position with said pockets out of communication with said slots to hold the rollers radially inwardly in line engagement with said cam surfaces, said sleeve rotatable from said angular position to move said pockets into communication with said slots and permit movement of the rollers out of the bore for insertion and removal of said tool member, (e) and means rotatably carried on the tool member to engage said locking sleeve for rotation thereof from said angular position as said tool member is inserted in said spindle member.

5. A quickly detachable torque transmitting tool connecting mechanism comprising in combination:

(a) a chuck adapted for rotation about a central axis having a bore on said axis with a terminal opening, said bore tapering outwardly toward said opening, at least a portion of the external surface of said chuck cylindrical about said axis and having at least three equally angularly spaced axially extending peripheral slots in communication with said bore, (b) a tool holder having a tapered seat portion to seat in said tapered bore and having a shoulder with at least three equally angularly spaced flats thereon tapered oppositely to said tapered portion, said flats axially aligned with said slots and toward the bore opening from said seat portion when the tool holder is seated in the bore, (c) a tapered roller received in each of said slots and movable radially inwardly therein to extend into the bore for line engagement with one of said flats, said tapered rollers positioned in complementary relationship to the flats on the tapered shoulder and having a taper approximately one-half the taper of said flats to render the outer element of each roller parallel to the cylindrical surface of the spindle member when the rollers are in line engagement with the tapered flats on the tool holder, said rollers effective when held in line engagement with said tapered flats to apply an axial force to said tool holder holding the tool holder in the chuck and effective to apply a force to said tool holder locking the tool holder against rotation relative to the chuck, said forces increasing as the torque between the chuck and the tool holder increases, (d) an axially fixed locking sleeve received on the cylindrical surface portion of said spindle member and over said slots for rotation about said axis, said sleeve having a pocket on the inner surface thereof for each slot, said sleeve normally biased to an angular position with said pockets out of communication with said slots to hold the rollers radially inwardly in line engagement with said tapered flats, said sleeve rotatable from said angular position to move said pockets into communication with said slots to permit movement of the rollers out of the bore for insertion and removal of said tool holder, and (e) a cup rotatably received on said tool holder and having a limited axial movement thereon, said cup adapted to frictionally engage said locking sleeve during insertion and removal of the tool holder to effect rotation of said locking sleeve from said angular position.

References Cited in the file of this patent

UNITED STATES PATENTS

| | | |
|---|---|---|
| 1,781,442 | Currier | Nov. 11, 1930 |
| 2,466,315 | Johansson | Apr. 5, 1949 |
| 2,906,541 | Du Bois | Sept. 29, 1959 |